United States Patent [19]

Filan et al.

[11] 4,032,169
[45] June 28, 1977

[54] DRAWBAR ASSEMBLY

[76] Inventors: Alton N. Filan; A. LaVerne Filan, both of Rte. 1 Box 69, Waitsburg, Wash. 99361

[22] Filed: June 7, 1976

[21] Appl. No.: 693,358

Related U.S. Application Data

[63] Continuation-in-part of Ser. No. 578,149, May 16, 1975, Pat. No. 3,974,880.

[52] U.S. Cl. .......................... 280/405 B; 172/443; 280/476 R
[51] Int. Cl.² .................. B60D 1/16; A01B 59/042
[58] Field of Search ....... 280/476 R, 476 A, 405 R, 280/405 A, 405 B, 406 R; 214/130 R, 86 A; 172/443, 444

[56] References Cited

UNITED STATES PATENTS

| 2,786,589 | 3/1957 | Garrett | 172/443 X |
| 3,679,230 | 7/1972 | Farrant | 280/405 B |
| 3,692,331 | 9/1972 | Vegors | 280/405 R |
| 3,974,880 | 8/1976 | Filan | 172/443 |

*Primary Examiner*—Joseph F. Peters, Jr.
*Assistant Examiner*—R. Schrecengost
*Attorney, Agent, or Firm*—Wells, St. John & Roberts

[57] ABSTRACT

A drawbar assembly for transporting three point hitch implements in an elevated or lowered condition by a single point connector towing vehicle. The assembly is wheel supported and mountable between the connector of a towing vehicle and the three point connectors of a three point hitch trailing unit such as a plow or other farm implement. The three point connectors are movably mounted relative to a central supporting framework. A jack assembly and appropriate linkage interconnect the three point connectors with the framework to enable movement of the three point connectors and attached implement between an elevated carrying position and a lowered operating position. The jack assembly is operated through provision of conventional accessory drive units provided on the towing vehicle. A tongue load relieving mechanism is also provided, operatively connecting the implement and tractor to reduce the load normally transferred to the hitch members through the tongue of the drawbar assembly. Shock loads, received when the implement is in the elevated condition, are dampened through the stabilizer assembly. The drawbar assembly pivots about the axis of a pin near the tractor drawbar to avoid binding the tractor and drawbar hitch members together.

7 Claims, 4 Drawing Figures

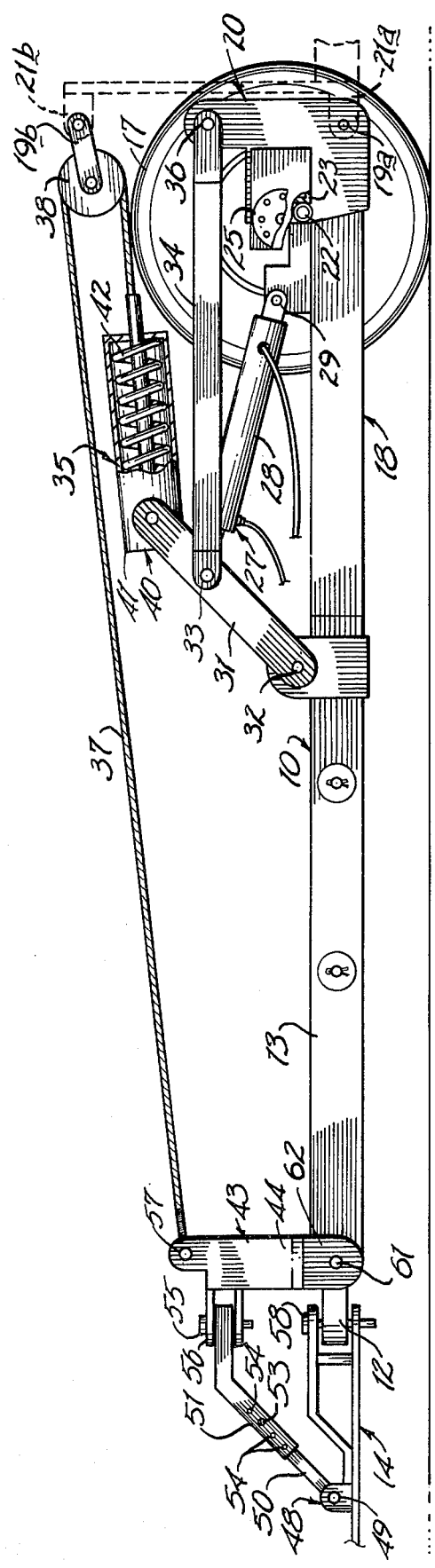

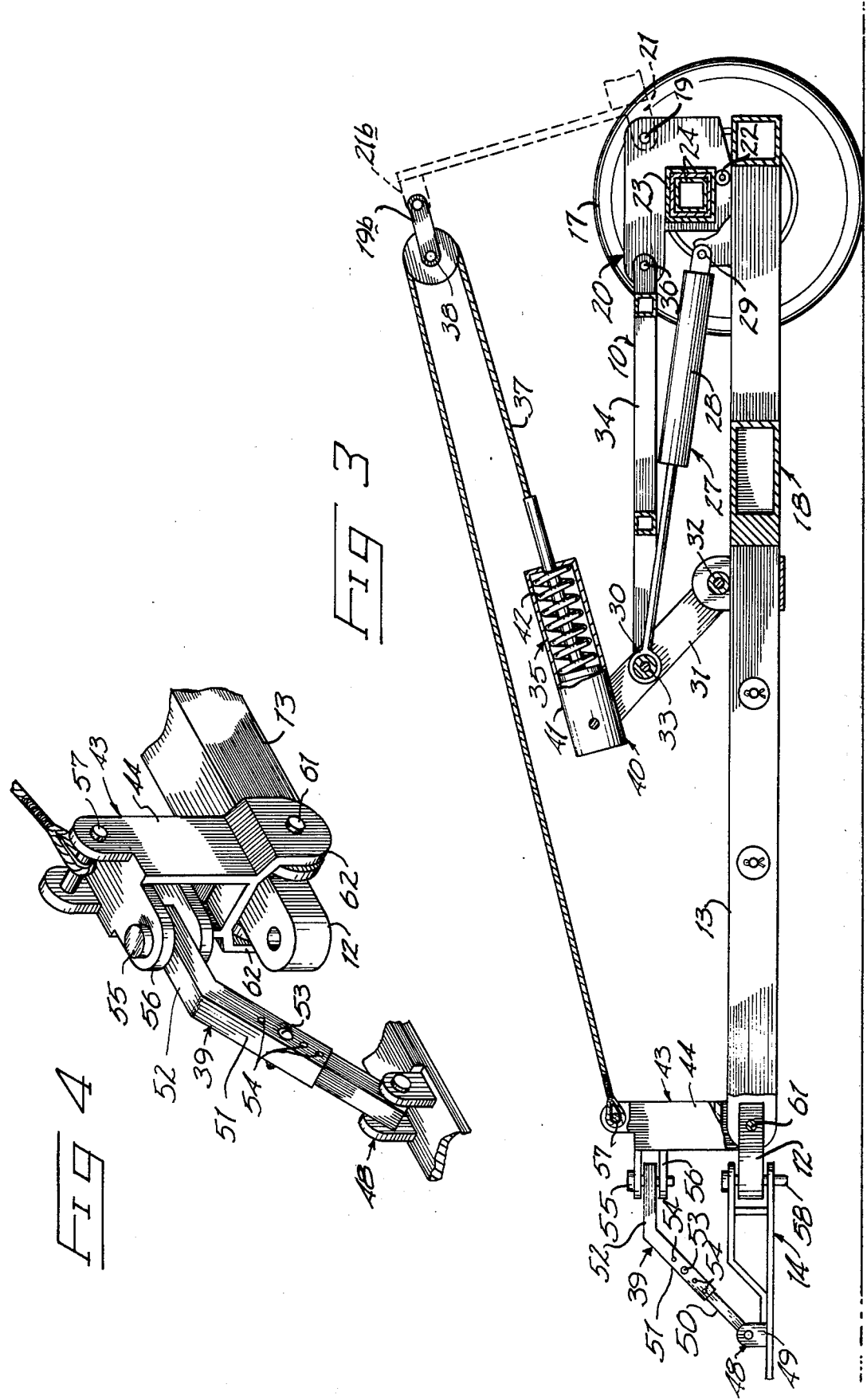

DRAWBAR ASSEMBLY

This application is a continuation-in-part of U.S. Patent Application Ser. No. 578,149 now U.S. Pat. No. 3,974,880 and priority is claimed to the May 16, 1975 filing date thereof.

BACKGROUND OF THE INVENTION

The present invention relates to adaptor assemblies for enabling a three point type trailing unit to be towed behind a draft vehicle having a single point towing connector, and more particularly to such units having a lifting mechanism selectively operable to raise or lower the attached implement while providing support in the raised position while stabilizing the load on the tongue of the assembly while the implement is raised.

Modern agricultural technology has led to the development of implements to be towed behind a draft vehicle in ground working operations that are extremely large and equally heavy. Transportation of such implements is becoming increasingly difficult, especially along roadways to and from fields. In addition, such heavy implements when utilized in the field, are ordinarily too heavy to lift into an inoperative position without producing an often dangerous imbalance to the towing vehicle. Further still, it has become desirable to provide some type of mechanism whereby a large crawler type tractor having a single pintle type towing hitch may be operatively connected to a ground working implement having a conventional three point hitch assembly. It is also desirable to reduce stress as much as possible at the point of connection for the towing vehicle and implement, especially when the implement is to be carried in an elevated condition.

The present invention was designed in order to alleviate the above problems by providing both an adaptor to fit intermediate a single point hitch towing vehicle and a three point hitch trailing implement with the added provision of means for elevating the implement to an above ground inoperative position. The present invention further includes provisions for supporting the implement in a raised position without transmitting an excessive load to the towing end of the draft vehicle.

SUMMARY OF THE INVENTION

A combination is described in an adaptor assembly for connecting a three point hitch implement to a single point hitch draft vehicle. The combination includes a first framework with a forward connector member on a tongue thereof for operative engagement with a complementary hitch member of the draft vehicle. A secondary wheel supported framework is mounted to the first framework for pivotal movement about a horizontal pivot axis. The secondary framework includes rearwardly facing three point hitch connectors thereon rearward of the wheels for operative engagement with complementary connectors of the three point hitch implement. A jack means interconnects the first and secondary frames and is operable to pivot the three point connectors and an implement attached thereto relative to the first framework between (a) a first position wherein the implement is held in an operative ground engaging condition and (b) a second position wherein the implement is lifted from the ground and is supported directly by the adaptor assembly.

A tongue load relieving assembly is also included in the combination. It is utilized to indirectly transfer a part of the static load on the tongue (created by the implement when held in the second, cantilevered position) to the towing vehicle. A stabilizing means is also included in cooperation with the load relieving assembly to apply a downward reaction force against upward thrust of the tongue at a forward location thereon adjacent the forward connector member when the implement is carried in the second position.

One object of the present invention is to provide a mechanism whereby a three point hitch trailing implement may be operatively engaged to a single point hitch draft vehicle.

Another object is to provide such a device that may be selectively operated to raise the attached implement to an inoperative elevated position or lower it to an operative ground engaging position.

A further object is to provide such a device that is wheel supported and will carry a substantial amount of the implement weight when held in the elevated inoperative position.

An additional object is to provide such a device wherein vertical static forces are not transmitted from the cantilevered implement (when in the elevated position) through a tongue member of the device but rather to the frame of the towing vehicle.

It is a still further object to provide such a device that is relatively simple and rugged in construction and is thereby substantially maintenance free.

These and still further objects and advantages will become apparent upon reading the following description which, taken with the accompanying drawings, describe a preferred form of the present invention.

BRIEF DESCRIPTION OF THE DRAWINGS

FIG. 2 is a sectional view taken along line 2—2 in FIG. 1;

FIG. 3 is a sectional view taken along line 3—3 in FIG. 1; and

FIG. 4 is an enlarged pictorial view of a portion of the present device.

DETAILED DESCRIPTION OF A PREFERRED EMBODIMENT

Figure 1:
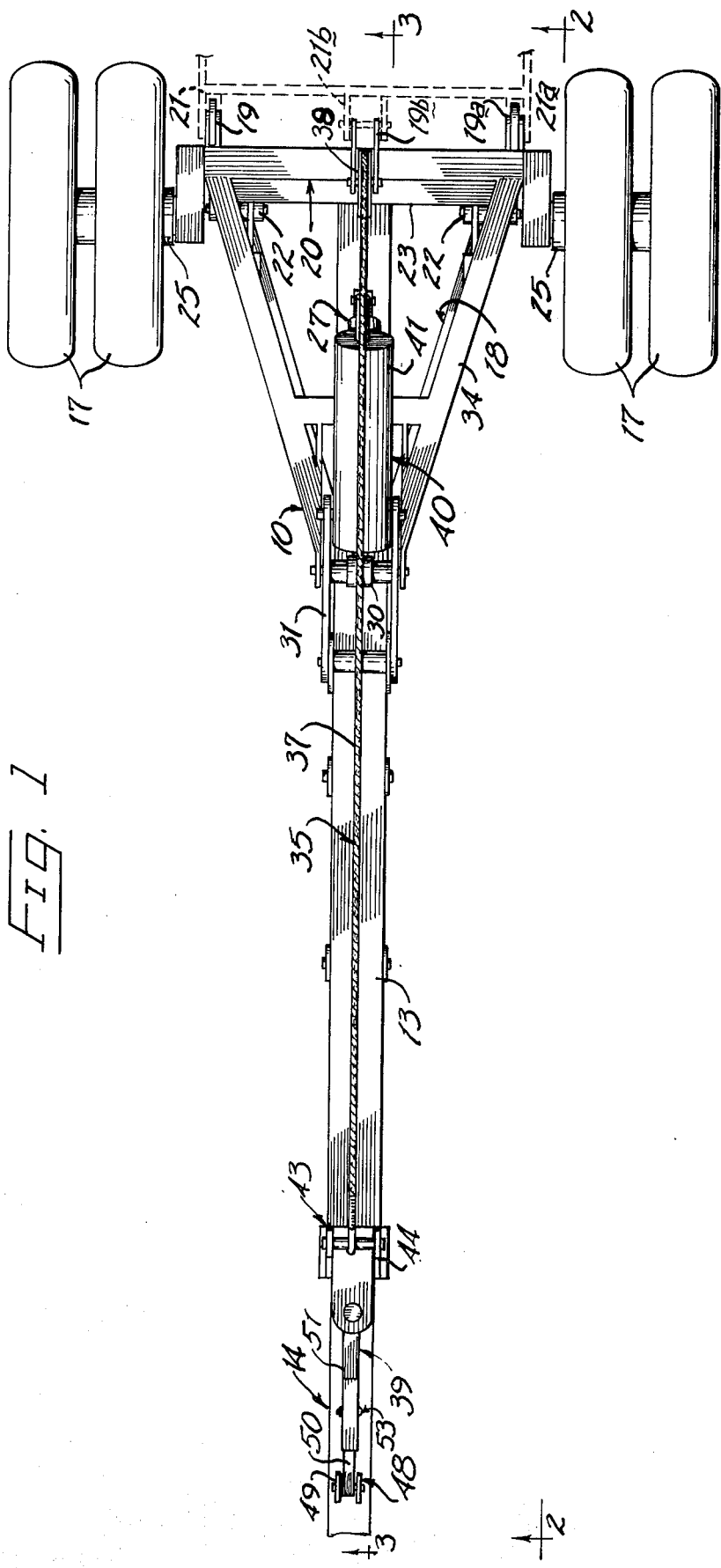
FIG. 1 is a plan view of the drawbar assembly.

The preferred form of the present drawbar adaptor assembly is illustrated by the accompanying drawings and is generally designated therein by the reference character 10. Drawbar adaptor assembly 10 is utilized to adapt a trailing implement (not shown) such as conventional agricultural ground working tools to a draft vehicle. Ordinarily, ground working implements include a three point hitch connector assembly that is adapted to be connected to a complementary set of connectors on a draft vehicle. However, not all draft vehicles include three point connectors, but rather include a single point hitch member as shown at 14 (FIGS. 2 and 3). It is well understood however that the present assembly could be as easily constructed to enable its adaptation to either a single point or a three point hitch connector of a draft vehicle.

The present assembly 10 includes a forward hitch member 12 operatively engageable with a complementary hitch member 14 of the draft vehicle.

The hitch member 12 is pivotably mounted at the forward tongue end of a first framework 18. The pivot connection between frame 18 and member 12 is provided to enable relative movement between the assembly and towing vehicle about a horizontal axis. The tongue portion of framework 18 is indicated at 13. Tongue portion 13 may be extensible, allowing an operator to select the distance between the towing vehicle and trailing implement. A secondary framework 20 is mounted to first framework 18 and includes wheels 17 thereon for supporting nearly all the weight of the assembly plus the weight of an attached implement.

As may be noted in FIGS. 2 and 3, the secondary framework 20 pivots about laterally spaced aligned pivot hinges 22. Three point connectors 19, 19a and 19b are provided at a rearward frame end to receive complementary connectors 21, 21a and 21b of trailing implement. The lower connectors are located below the hinge axis in a first operative position and above the axis in a second inoperative position.

The wheels 17 are mounted to a transverse axle 23. Axle 23 may be comprised of several transverse telescoping channel members 24 as shown in FIG. 3. A wheel hub 25 is mounted at either end of axle 23 to receive single or dual wheels 17 as shown in FIG. 3. It should be noted particularly with reference to FIGS. 2 and 3, that the rotational axis of wheels 17 is offset from the axis of the pivot hinges 22. This is an operational provision and will be discussed in greater detail later on in the specification.

The wheels 17, through provision of extensible channels 24, may be selectively spaced apart to facilitate greater stability while plowing or performing other field working procedures. When drawn together to a compact position as shown in FIG. 1 of the drawings, the wheels enable transport along highways or narrow roads.

A jack means 27 is provided intermediate the secondary framework 20 and first framework 18 and is operable to pivot the secondary framework 20 about the horizontal axis of hinges 22. Jack means 27 operates to selectively move the secondary framework and an implement attached thereto between the operative position (FIG. 2) and the inoperative elevated position (FIG. 3). Jack means 27 includes a hydraulic cylinder 28. Cylinder 28 is connected at a rearward end 29 to the first central framework 18. A ram end 30 of cylinder 28 is connected to the remainder of the jack assembly. The remaining elements of jack means 27 include a lever arm 31 pivotally mounted to framework 18, and a triangular connecting beam 34 extending between the lever arm 31 and secondary framework 20.

Lever arm 31 is centrally located on framework 18 and is pivotally held for movement about a pivot 32. It may be noted in FIGS. 2 and 3 that a plane containing the pivot axis of hinges 22 and of pivot 32 is parallel to a horizontal ground plane. The connecting beam 34 is pivotally mounted at one end by a pivot 33 to lever arm 31. The remaining end of connecting beam 34 is mounted to secondary framework 20 by a pair of coaxial pivots 36. Pivots 33 and 36 also lie within a horizontal plane and are longitudinally spaced apart by a distance equal to the longitudinal distance between the pivot 32 and hinges 22. This defines a parallelogram type linkage whereby angular pivotal movement of lever arm 31 will result in an equal corresponding angular movement of secondary framework 20 about the axis of hinges 22.

Connecting points 19, 19a and 19b are provided at the rearward end of assembly 10 by the secondary framework 20 and by a linkage means 35 extending from front to rear of the complete assembly. The lower laterally spaced connectors 19 and 19a are formed integrally with the secondary framework 20. These connecting points are shown to best advantage by FIGS. 2, 3 and 4. The upper connecting point 19b is located only by the relative position of the upper connecting member 21b of the associated implement. This is so because the upper connecting point of assembly 10 is loosely held by a cable 37 between a load relieving assembly 39 (described below) and secondary framework 20.

Cable 37 extends rearwardly from shock absorbing means 40 and over sheave 38. The cable wraps about sheave 38 and then extends forwardly to the load relieving assembly 39.

Shock absorbing means 40 includes a relatively strong compression spring 42 and a plunger member 43 that is secured to cable 37. Tension applied to the cable 37 will result in compression of spring 42 within its cylindrical cannister 41. Therefore, as the jack means is operated to move the implement to the raised position, the cable 37 will draw the connecting points 19b and 21b forwardly. The primary purpose of compression spring 42 is to compensate for road shocks when the implement is being carried in the inoperative position. Undesired shock loads between the implement and assembly 10 are taken up as spring 42 compresses or extends under the levered weight of the trailing implement.

The load relieving assembly 39 is provided to transfer part of the static load of the implement (when it is carried in the second position) to the towing vehicle. This load is produced by the implement which is cantilevered rearwardly from the connectors 19, 19a and 19b. Normally the cantilevered weight of the implement would operate through the wheel axis to produce a static upward moment directed through the tongue 13 against hitch members 12 and 14. Much of this load is transferred through the present assembly 39 directly to the tractor frame. This is done through the interconnection of cable 37 and load relieving means 39. A tongue stabilizing means 43 is also provided in conjunction with the load relieving means to react against the upward moment of tongue 13 by providing a reactionary downward force through stabilizer brace 44.

The load relieving means 39 includes a bracket means 48 that is adapted to be fixed to the towing vehicle framework forward of its hitch member 14. Bracket means 48 includes a base 49 and an elongated tubular channel 50 extending therefrom. The channel 50 slidably receives a telescoping arm 51. Arm 51 is adjustably positioned within tubular channel 50 through a selectively removable pin 53 that may be received within any one of several spaced apertures 54 formed through the arm 51. Provision of the pin 53 and spaced apertures 54 enables longitudinal adjustment of the effective length of the bracket means to facilitate mounting of the assembly on different models of towing vehicles.

An upper end 52 of the telescoping arm 51 is mounted through a pin 55 to a clevis 56. The clevis is an integral part of both the load relieving means 39 and tongue stabilizer means 43. Clevis 56 is connected directly to an end of cable 37 through a cross pin 57. Thus, moment produced at the upper connector 19b is transmitted through the cable 37 directly to the towing vehicle frame.

It may be noted that pin 55 is in coaxial alignment with the corresponding pin 58 that interconnects the hitch members 12 and 14. This arrangement allows free relative movement of the towing vehicle and trailing assembly and implement about the pin axis. Although slight misalignment may occur, the pins are held sufficiently coaxial to prevent binding when the towing vehicle turns.

The tongue stabilizer means 43 includes the stabilizer brace 44 as briefly described above. Brace 44 includes lower ears 62 that are projected downwardly to connect with pin 61. A pin 61 extends horizontally through each ear 62 and correspondingly through the forward tongue end and hitch member 12. Thus, all three elements (tongue 13, brace 44, and connector member 12) are pivoted about the same axis as defined by pin 61.

The shock absorbing means 40 is connected to cable 37 to effectively relieve sudden shock loads delivered through connector member 19b to the towing vehicle framework and drawbar assembly 10. It should be noted however that the placement of means 40 is not restricted to the specific location shown in the drawings. It is understood that the positioning of means 40 could be such that the pin 57 would mount a rearward end of the cannister 41 and cable 37 would extend from the cannister, over sheave 38 and subsequently forwardly to the upper end of lever 31.

In order for operation, the present assembly must first be attached to a towing vehicle with the vehicle hitch member 14 operatively engaging the hitch member 12 of the present assembly. When thus connected, the assembly is backed into position in contact with the three point hitching elements 21, 21a and 21b of a selected implement. The corresponding hitch points 19, 19a, and 19b and 21, 21a and 21b are then joined, and cylinder 28 is connected to the hydraulic pressure supply of the draft vehicle.

To elevate the implement then for highway travel, the jack means 27 is operated, extending cylinder 28. This motion results in corresponding pivotal movement of the parallelogram linkage defined by lever arm 31 and connecting beam 34, along with secondary framework 20 and framework 18. The forward pivotal movement of jack means 27 results in corresponding pivotal movement of the secondary framework about the axis of hinges 22. As shown in FIG. 3, this movement also results in upward pivotal movement of the lower hitch points 19, 19a to the location shown in FIG. 3. It should be noted that the amount of elevational movement of hitch points 19, 19a is effected not only by their rotational movement about the axis of hinges 22, but also by the pivotal movement of the wheel axis about the axis of hinges 22. Thus, as the secondary frame is pivoted, the hitch points 19, 19a are raised relative to frame 18 and frame 18 is raised simultaneously relative to the ground.

While jack means 27 is operating to elevate the lower hitch points, the linkage means 35 operates simultaneously in response to the jack means to pull the upper hitch point forwardly. This movement results as the lever arm 31 pulls against cable 37. Thus, through linkage means 35, the upper implement connector 21b is pulled along an upright arcuate path forwardly to tip the implement upwardly as it is being raised by frame connectors 19 and 19a. If a rigid connection is made between the three point connectors and the implement, the implement will be raised to an elevated condition and supported primarily by the wheels 17 and stabilized by relief assembly 39. Therefore, the vertical downward load of the implement is not transferred to the rearward end of the towing vehicle.

The vertical downward load of the implement acts as a force against a fulcrum at the axes of hitch points 19, 19a to produce strong rearward force at hitch point 19b. The directional force at 19b is transmitted through cable 37 partly to the tongue 12 (through lever 31) and partly to the towing vehicle frame through provision of the load relieving means 39. Thus only a portion of the total force produced through hitch point 19b is transmitted through the tongue 13 to the interconnected hitching members 12 and 14. Further, since the force (through lever 31) is applied at a point near the wheel axis, the resulting vertical moment at the forward tongue end is nearly negligible.

The tongue stabilizer means 43 operates to hold the pin 61 in relatively stationary horizontal alignment with the interconnected hitch members 12 and 14. Therefore, when the towing vehicle and assembly are angularly misaligned (as when the vehicle moves over the crown of a hill with the wheels 17 not yet reaching the crown), the connected hitch members 12 and 14 will not bind. Instead, the assembly and draft vehicle will articulate about pin 61.

Shock loads which may be imparted to the tongue 13 through bouncing of the implement when carried in the second inoperative position, are met by an opposed vertical reaction force presented through the stabilizer brace 44 against pin 61.

The pin 55 interconnects the bracket 48 and brace 44 to allow relative turning of the implement and assembly 10 in a horizontal plane. The axis of pins 55 and 58 are maintained relatively coaxial for this purpose.

To move the implement back to an operative position as shown in FIG. 2, the cylinder 28 is actuated to retract. This movement causes the corresponding elements including secondary framework 20 to pivot rearwardly. In doing so, the lower connecting points are pivoted downwardly about the axis of hinges 22 and the wheel axis is pivoted simultaneously upwardly and forwardly. Further, as the lever arm is pivoted rearwardly, the cable 37 is allowed to release tension on the sheave 38 and compression spring 42, allowing the upper connecting point to return to a normal position.

The above description and attached drawings described only a preferred form of our invention. It is well understood that various changes can be made therefrom without departing from the scope of this invention. Therefore, only the following claims are to be taken as restrictions placed upon the scope of our invention.

What we claim is:

1. In a drawbar adapter assembly for connecting a three point hitch implement to a towing vehicle, the combination comprising:
    a first framework;
    a forward connector member on a tongue of said first framework for operative engagement with a complementary hitch member of a towing vehicle;
    a secondary framework mounted to said first framework for pivotal movement about a horizontal pivot axis and having three rearwardly facing three point hitch connectors thereon for operative engagement with complementary connectors of a three point hitch implement;
    wheel means for movably supporting the first framework and secondary framework above the ground surface;

wherein the three point hitch connectors are adapted to support an attached implement extending rearward of the wheel means;

jack means interconnecting said first and secondary frameworks and operable to pivot said three point connectors and attached implement relative to said first framework between (a) an operative position wherein the implement is held in an operative ground engaging condition for movement by the draft vehicle and (b) an inoperative position wherein the implement is lifted from the ground and is supported by said adapter assembly;

tongue load relieving means operatively connected between the three point hitch connectors and the towing vehicle for transferring part of the static load of the implement to the towing vehicle when said implement is carried in the inoperative position; and tongue stabilizing means for applying a substantially vertical reaction force at a location rearwardly adjacent the connector member in response to substantially vertical moment of the tongue about the axis of said wheel means.

2. The combination set out by claim 1 further comprising:

bracket means adapted to be fixed to the towing vehicle forward of its hitch member;

linkage means extending between one of said three point connectors and said bracket means; and wherein said jack means is operatively connected to said linkage means for raising and lowering the implement.

3. The combination as set out by claim 2 wherein the tongue stabilizing means is comprised of a stabilizer brace pivotably mounted to the bracket means for movement about an axis in substantial alignment with the pivot axis of the connector member and hitch member, said stabilizer brace extending downwardly from the bracket means with a lower end pivotably mounted to said tongue.

4. The combination as set out in claim 1 wherein the tongue stabilizing means is comprised of a stabilizer brace pivotably mounted to the tongue load relieving means for movement about an axis in alignment with the interconnected forward connector member and hitch member of the towing vehicle, said brace extending downwardly from the tongue load relieving means with a lower end pivotably mounted to the tongue about a transverse horizontal axis.

5. The combination as set out in claim 2 wherein said jack means is comprised of:

a hydraulic cylinder connected at one end to the first framework;

a lever arm pivotably mounted to the first framework and connected to the remaining end of said cylinder for pivotal movement in response thereto;

a connecting beam pivotably mounted at one end to said lever arm, with the remaining beam end pivotably mounted to said secondary framework at a pivot point spaced from said horizontal pivot axis.

6. The combination set out by claim 2 further comprising shock absorbing means between the jack means and load relieving means for dampening transmission of vibration and shock loads from the implement to the towing vehicle and adapter assembly.

7. The combination set out by claim 5 further comprising shock absorbing means between the hydraulic cylinder and bracket means for dampening transmission of vibration and shock loads from the implement to the towing vehicle and adapter assembly.

* * * * *